D. F. CURTIN.
SANITARY SODA CUP.
APPLICATION FILED NOV. 7, 1913.

1,139,018.

Patented May 11, 1915.

WITNESSES
S. E. Wade.
C. E. Trainor

INVENTOR
David F. Curtin
BY Munn & Co.
ATTORNEYS

UNITED STATES PATENT OFFICE.

DAVID F. CURTIN, OF CHICAGO, ILLINOIS.

SANITARY SODA-CUP.

1,139,018.  Specification of Letters Patent.  Patented May 11, 1915.

Application filed November 7, 1913. Serial No. 799,705.

*To all whom it may concern:*

Be it known that I, DAVID F. CURTIN, a citizen of the United States, and a resident of Chicago, in the county of Cook and State of Illinois, have invented a new and useful Improvement in Sanitary Soda-Cups, of which the following is a specification.

My invention is an improvement in sanitary soda cups, and has for its object to provide a cup of the character specified, for use in dispensing beverages, as for instance, in soda fountains and like places, wherein a holder is provided for permanent use and a particular form of cup for use with the holder, each cup being designed to be discarded after one using.

Figure 1:
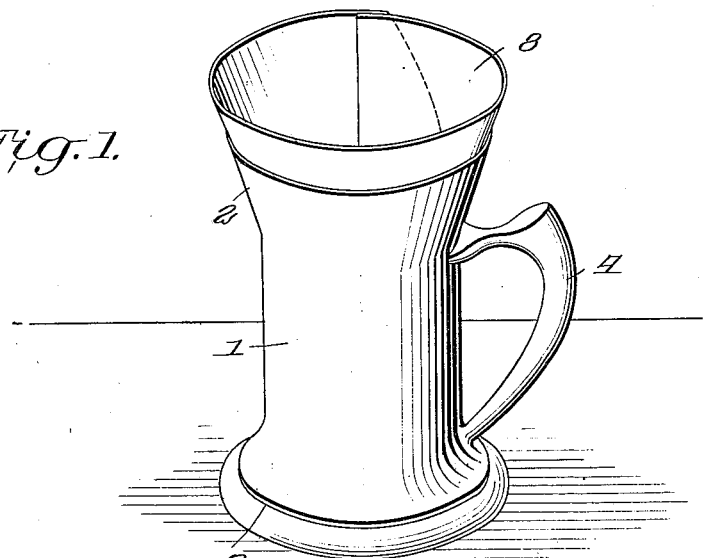
Figure 2:
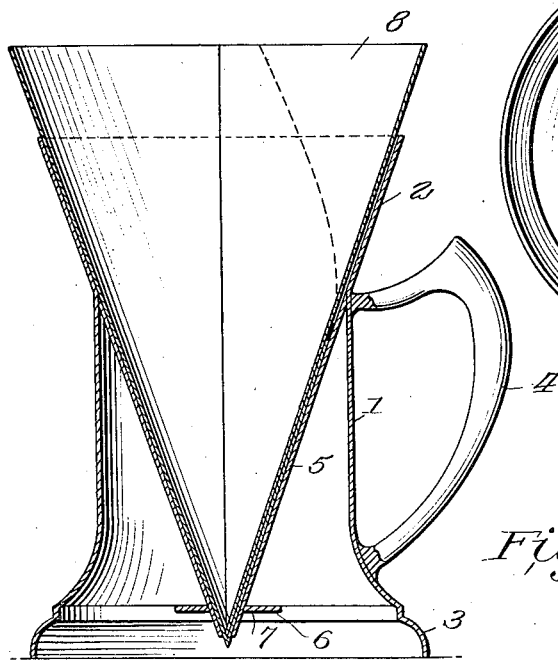
Figure 3:
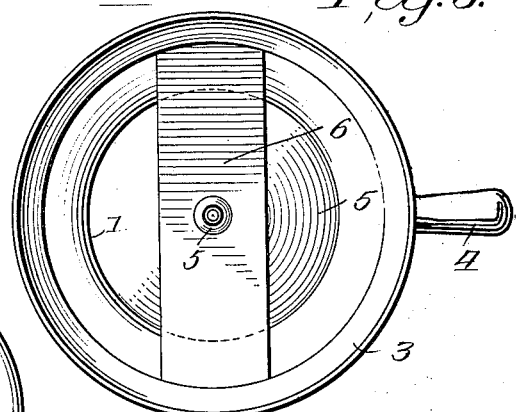
Figure 4:
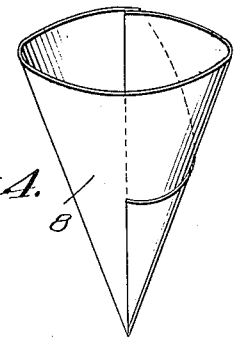

In the drawings:—Figure 1 is a perspective view of the cup and holder, Fig. 2 is a vertical section through the cup and holder, Fig. 3 is a bottom plan view of the holder, and Fig. 4 is a perspective view of the cup.

In the present embodiment of the invention, the holder, which may be of metal of any suitable character or of any other desired material, comprises a cup consisting of a cylindrical body 1, a flaring top 2, and a flaring ornamented base 3. A handle 4 is also provided in connection with the cup, the said handle being connected to the cup body or integral therewith, as may be desired. A frusto-conical support 5 is arranged within the cup, and a plate 6 is arranged transversely of the body, near the junction of the base therewith for supporting the lower end of the support.

The plate 6 is connected at its ends with the body of the cup, and at its center the plate is provided with an opening 7 through which the lower end of the support 5 extends, and the support may be connected with the plate if desired.

The upper end of the support 5 fits against the inner face of the body 1 at its junction with the flaring portion 2 and the inner surface of the flaring portion and the support 5 are continuous.

The cup proper is composed of paper or the like, preferably impregnated with paraffin. The sheet from which the cup is rolled to form a conical receptacle 8, is of such size that it will fit within the support 5 and the flaring upper end of the cup and will extend above the upper edge of the said flaring portion 2.

The lower end of the peak of the cup extends through the open small end of the support 5, and the cup and the support are so arranged that the said peak will be above the surface upon which the base 3 of the holder rests.

In use, the cups 8 are placed in the holders as shown in Fig. 2, with the apex or peak of the cup extending through the open lower end of the support. After the cup has been used it may be removed easily merely by pressing upward on the peak or apex of the cup, or when the holder is reversed, such pressure is downward. But slight pressure is required to force the cup free from the holder, and it may be dropped into a receptacle without requiring the dispenser to touch the upper edge of the cup which has been touched by the drinker of the beverage.

In addition the open lower end of the holder permits the cup to fit smoothly and tightly in the holder, to make a perfect contact between the walls of the cup and the holder, thus preventing any breaking of the paper from which the cup proper is formed, by a spoon or the like used to stir the mixture or to assist in disposing of the contents of the cup.

It will be evident that on account of the contact of the cup with the holder throughout that portion of the cup which contains the beverage, the contents of the cup may be stirred or mixed with a spoon or other instrument without any possibility of breakage or injury to the wall of the cup.

The opening at the lower end of the support has another function, in that it permits the free passage of water through the holder when cleansing the same. It will be noted also that the bottom of the holder proper is open, so that in the washing of the holder, the water may have access to each and every part of the holder.

The cup is so arranged with respect to the holder that the upper edge thereof extends far enough above the upper edge of the holder to prevent any engagement between the lips of the drinker and the cup proper. The entire contact is with the material of the cup, that is the paper, which is afterward destroyed.

It will be understood that the holder may be of any desired material and may be of various shapes, and variously ornamented in accordance with the wishes of the parties purchasing the same. The essential feature is the conical or frustoconical support for the cup proper, the said support having the opening at its apex to permit the apex of the cup proper to pass through the said opening.

The cup 8 may be of paper or any other desired material as may also the holder, it being understood that the holder is of rigid material.

I claim:—

1. A device of the character specified, comprising a cup consisting of a substantially cylindrical body having an annularly enlarged base and provided with a handle, the upper end of the cup flaring above the handle, a plate arranged transversely of the body near the junction of the base therewith, said plate having an opening at the axis of the body, and a frusto-conical support having its small end seated in the opening of the plate and having its large end engaging the internal surface of the body at the commencement of the flaring portion, the inner surface of the support being continuous with the inner surface of the flaring portion of the cup, the small end of the support being open and supported at a height such that the apex of a conical receptacle in the support will be above the lower plane of the base.

2. A device of the character specified, comprising a cup, consisting of a substantially cylindrical body having a base and provided with a handle, the upper end of the cup flaring above the handle, a plate arranged transversely of the body near the junction of the base therewith, said plate having an opening at the axis of the cup, and a frusto-conical support having its small end seated in the opening of the plate and having its large end engaging the internal surface of the body at the commencement of the flaring portion, the inner surface of the support being approximately continuous with the inner surface of the flaring portion of the cup, the small end of the support being open and being spaced above the lower plane of the base to bring the apex of a conical receptacle in the support above the said plane.

DAVID F. CURTIN.

Witnesses:
 ANNA M. OBORN,
 LOUIS P. FLYNN.